(12) United States Patent
Wuestefeld et al.

(10) Patent No.: US 8,749,628 B2
(45) Date of Patent: Jun. 10, 2014

(54) DRY AGRICULTURAL MATERIALS MANAGEMENT

(75) Inventors: Eric A Wuestefeld, Westminster, CO (US); Gurcan Aral, Cupertino, CA (US); Michael F Cash, Mountain View, CA (US); Arthur F Lange, Sunnyvale, CA (US); Gregory C Best, San Francisco, CA (US)

(73) Assignee: Trimble Navigation Limited, Sunnyvale, CA (US)

( * ) Notice: Subject to any disclaimer, the term of this patent is extended or adjusted under 35 U.S.C. 154(b) by 559 days.

(21) Appl. No.: 13/023,411

(22) Filed: Feb. 8, 2011

(65) Prior Publication Data
US 2012/0200697 A1    Aug. 9, 2012

(51) Int. Cl.
*H04N 7/18*    (2006.01)
*G01F 25/00*    (2006.01)
*B65G 43/08*    (2006.01)

(52) U.S. Cl.
CPC .................. *H04N 7/18* (2013.01); *G01F 25/00* (2013.01); *B65G 43/08* (2013.01)

USPC ............ 348/89; 177/1; 198/810.01; 348/137

(58) Field of Classification Search
CPC ............ H04N 7/18; G01F 25/00; G01G 9/00; B65G 43/08; G01N 21/85
USPC .......................... 348/137; 198/810.01; 177/1
See application file for complete search history.

(56) References Cited

U.S. PATENT DOCUMENTS

| | | | |
|---|---|---|---|
| 5,959,257 A * | 9/1999 | Campbell et al. ............... | 177/16 |
| 7,211,745 B1 * | 5/2007 | Brown et al. ..................... | 177/1 |
| 2002/0014116 A1 * | 2/2002 | Campbell et al. ............... | 73/149 |
| 2011/0042278 A1 * | 2/2011 | Janssen ........................ | 209/44.2 |

* cited by examiner

*Primary Examiner* — Y Lee
*Assistant Examiner* — Irfan Habib
(74) *Attorney, Agent, or Firm* — NUPAT, LLC; Morrison Ulman

(57) ABSTRACT

Systems and methods that improve farmers' ability to measure quantities of dry agricultural materials and rates of change of those quantities are disclosed. Also disclosed are systems and methods to rapidly and effectively communicate materials quantities and rates between farm equipment operators.

14 Claims, 8 Drawing Sheets

DRY AGRICULTURAL MATERIALS MANAGEMENT

TECHNICAL FIELD

The disclosure is related to management of dry agricultural materials such as grain.

BACKGROUND

Crop farmers collect, transport and disperse various kinds of dry agricultural materials as they plant, nurture and harvest their crops. Combine harvesters, for example, reap, thresh and winnow wheat, oats, rye, barley, corn, soybeans, flax and other crops. Grain collected in a combine is usually transferred first to grain carts and later to trucks for transport to silos or grist mills. Other kinds of dry agricultural materials include gravel, sand, salt, some fertilizers, herbicides and pesticides. Here, "dry" is in contrast to liquids such as water or aqueous solutions. "Dry" material need not be devoid of moisture, but "dry" does imply more friction with container walls than a liquid has, and minimal sloshing behavior.

Modern farms are sophisticated biomaterial factories that run complex production processes. Achieving high crop yield depends on precision management of land, machines, labor and materials. The more parts of a production process that can be measured, the more insight a farmer can obtain on where improvements are possible. Dry agricultural materials like grain are normally dealt with in truck size units, thousands of pounds at a time. Efficient management of these materials depends critically on the ability to measure the quantity of material on a truck or in a storage bin, and the rate of increase or decrease of that quantity; i.e. how fast a bin is filling or emptying.

FIG. 1 shows examples of the collection and dispersal of dry agricultural materials. In "A", a combine harvester is unloading grain to a cart; in "B" a spreader truck is spreading material over a field. Farmers need to know the answers to questions such as: How much grain is in the combine harvester's clean grain tank? How fast is the tank filling up? What is the weight of grain unloaded each time to the grain cart? How much (i.e. volume and/or weight) material is in the spreader truck? How fast is it being used up?

Measuring and keeping track of dry material quantities and rates provides important inputs to agricultural yield management systems that create maps of farm field productivity. Measuring the yield of a farm field is simple in theory, but difficult in practice. Combine harvesters, for example, are typically equipped with impact sensor plates at the top of their clean grain elevators to measure mass flow of grain before it falls toward the base of a bin loading auger. (Other types of mass flow sensors for grain include radiation, photoelectric and paddle wheel sensors.) The moisture content of the grain is estimated by passing it between capacitive sensing plates. Estimates of the amount of grain collected, as determined by integrating mass flow rates, are calibrated by comparison to grain weight measured by load cells in a grain cart. Machine movement, operating on slopes, friction effects from grain of different moisture content, and other problems can all lead to mass flow rate errors. Furthermore the inherent time lag of conventional calibration procedures reduces achievable precision and efficiency.

Thus what are needed are systems and methods to improve farmers' ability to measure quantities of dry agricultural materials and rates of change of those quantities. Also needed are systems and methods to rapidly and effectively communicate materials quantities and rates between farm equipment operators. When measurements of dry agricultural materials are accurate, rapidly available and communicated quickly to the farm workers that need them, farm yield management is improved and more crops can be produced at lower cost.

DETAILED DESCRIPTION

Introduction

Disclosed herein are systems and methods for management of dry, agricultural materials. Measuring devices and techniques for determining the weight, volume, and flow rate of various materials such as grain, oats, corn sand or gravel are described. In each case, improvements in accuracy, precision, or speed of measurements compared to conventional methods lead to better overall farm performance. Although the outdoor nature of farm work and the large machines involved make farming seem to a layman like an imprecise industry, really the opposite is true. Accurate data concerning the collection, transport and dispersal of agricultural materials is crucial to farm management and often high precision is required.

As an example, the net weight of grain in a grain cart might be 50,000 pounds fully loaded. Measurement of the weight of the grain to better than 0.5% (just a couple hundred pounds) is useful to farmers as it affects the calibration of yield maps showing how productive different parts of a field are. The maps then inform decisions about how the field must be treated to improve yield. Accuracy and precision in yield operations translate directly into efficiency of field treatments—efficiency that not only saves cost, but also reduces unneeded excess of fertilizers and pesticides.

The first dry agricultural material management system described below involves the measurement of the volume of material in a truck or storage bin using video or optical techniques. The second is based on a spectral measurement technique for measuring the weight of material in a truck. The third is a system for measuring the flow rate of dry agricultural materials as they are moved from place to place. Fourth is system for precise calibration of yield monitoring in combine harvesters. Finally, measurement and communication of grain levels using a time division multiplexed (TDMA) video system is described.

1. Video Measurement of Volume of Material in a Truck or Bin

Measurement of the volume of material in a truck or bin is important during collection, storage and dispersal operations. Spreading compost is an example of an operation where conventional techniques for measuring an amount of material in a truck are inadequate. Conventional weight measurements of a compost truck are too noisy when the truck is moving; the truck must stop to get an accurate reading of the weight of the remaining material. In many cases measuring the volume of material is an acceptable substitute for measuring weight.

Figure 1:
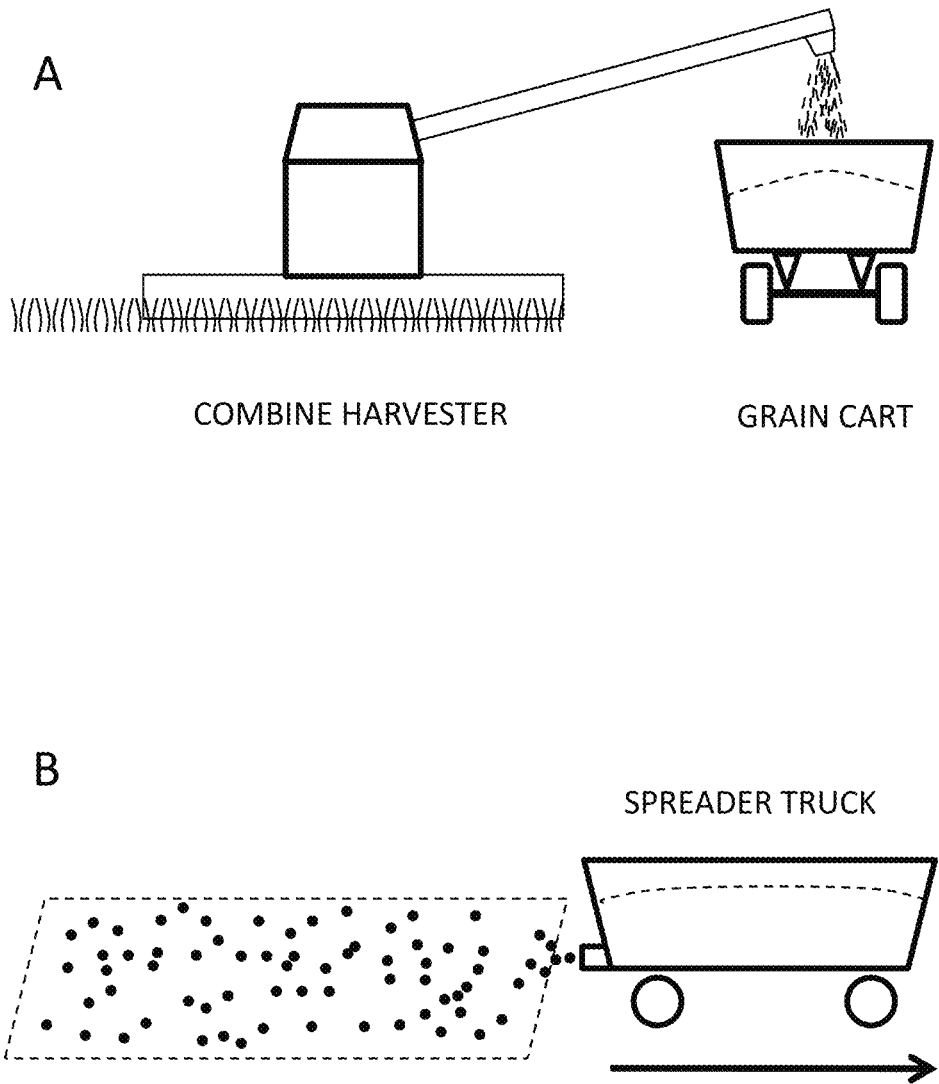
FIG. 1 shows examples of the collection and dispersal of dry agricultural materials.
Figure 2A:
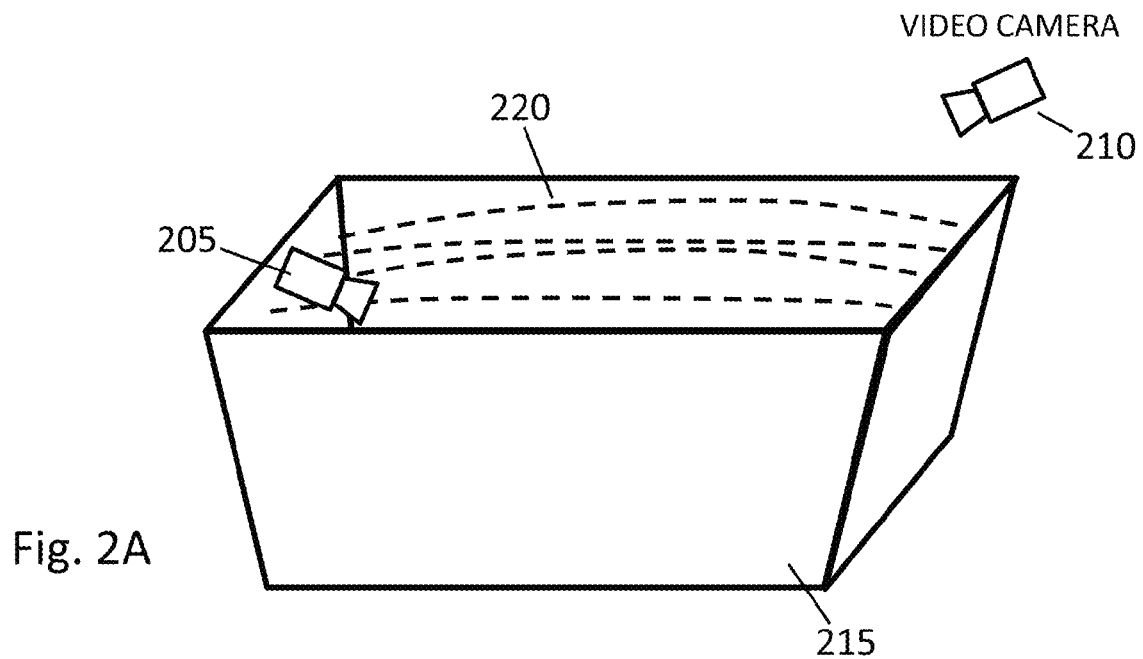
FIGS. 2A, 2B, 2C and 2D illustrate video and optical systems for measuring the quantity of dry agricultural material in a bin.

FIGS. 2A, 2B, 2C and 2D illustrate video and optical systems for measuring the quantity of dry agricultural material in a bin. In FIG. 2A video camera 205 and optional video camera 210 are mounted such that they view the inside of a storage bin 215. Either video camera may be mounted inside or outside the bin. Bin 215 may be the storage compartment of a truck or a fixed silo, as examples. Dotted lines, such as dotted line 220, indicate the shape of the surface of material in the bin.

The video system of FIG. 2A uses video images to estimate the volume of material in the bin. The cameras literally "see" how much material there is. When two cameras (e.g. 205, 210) are used, stereo images may be used to estimate surface contours such as those represented by dotted line 220. Alternatively, laser scanners or 3D video systems may also be used to estimate surface contours. The shape and position of the surface contours, combined with knowledge of the size and shape of the bin, lead directly to a volume estimate for material in the bin.

Figure 2B:
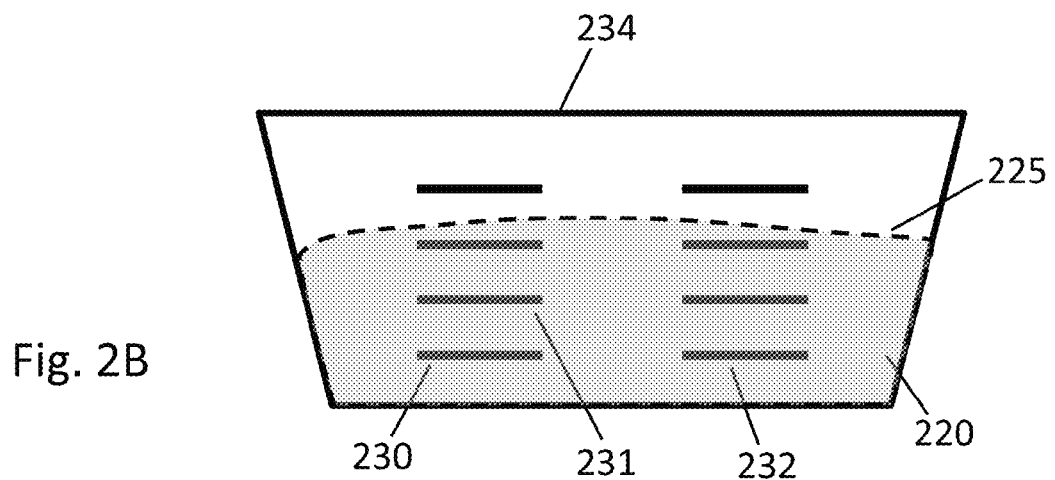

In FIG. 2B the inside of one wall 220 of bin 215 is shown. Dotted line 225 represents the shape of the surface of material in the bin in analogy to line 220. Reference lines 230, 231, 232 are fixed on the inside wall 220 of the bin. Finally, 234 calls out the top edge of bin 215.

When reference marks such as 230, 231, 232 are present, the volume of material in bin 215 can be estimated with just one video camera (e.g. 205). The reference marks indicate levels of material that correspond to premeasured volumes. The video camera obtains images of the inside wall 220 of the bin. The volume of material is estimated based on which reference marks are visible. The reference marks may have identifying characteristics such as shapes, text or other labels. When reference marks are used, the position of the video camera (e.g. 205) used to view them is not critical. On the other hand, if the video camera is mounted in a fixed, calibrated location, then reference marks may not be necessary. If the top edge 234 (or other identifying feature) of the inside of the bin is visible, then the level of material in the bin may be estimated based on its position in a video image. For example, 100 pixels down from the top edge of the bin might represent 900 bushels while 200 pixels down might represent 800 bushels.

Lighting systems may be used to improve the visibility of material and/or reference marks in the bin as needed. The reference marks may be colored or include dashes, dots or other identifying features. As an example, green reference lines might be used near the bottom of a bin, yellow near the middle and red near the top. In that case the color of the lines, in addition to or instead of, their position indicates the amount of material in the bin. In another example, reference lines may be dashed with lines near the bottom of a bin having long dashes and lines having progressively shorter dashes marked farther up the bin.

Alternatively, the reference marks may themselves be lights. For example, the reference marks may be light emitting diodes preferably emitting at a wavelength matched to the camera's image sensor. Further, light emitting diodes may be modulated. If the modulation source is also connected to a sync input of the camera, synchronous or lockin detection techniques may be used to improve performance in low visibility conditions. The modulation may be different for different reference marks thus providing another way to identify them.

Figure 2C:
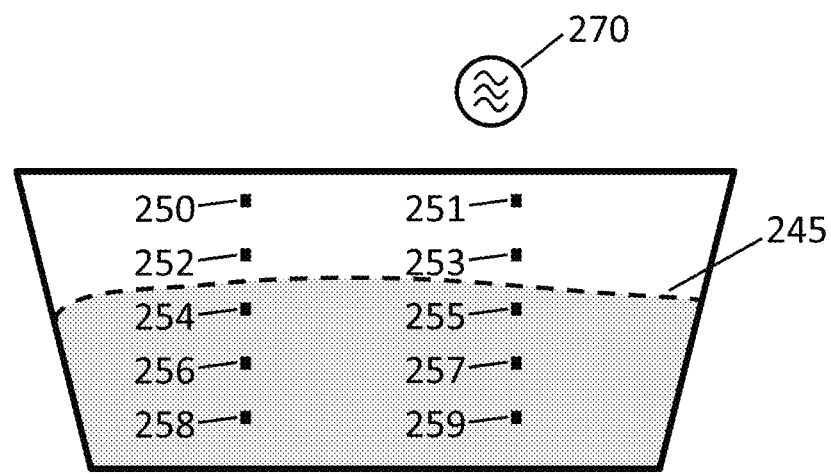
Figure 2D:
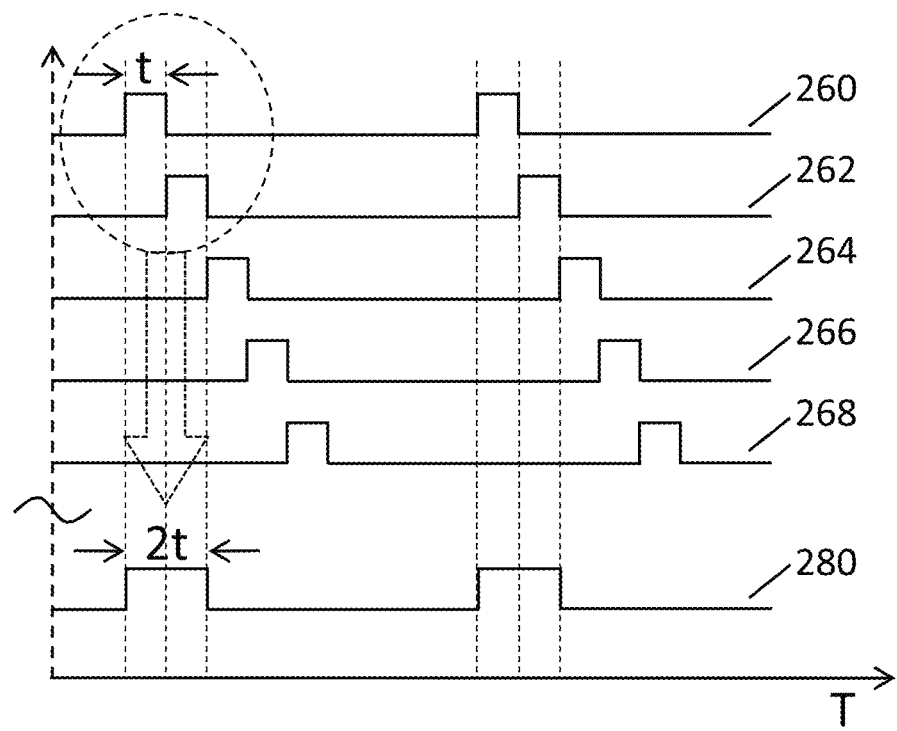

FIGS. 2C and 2D illustrate optical systems for measuring the quantity of dry agricultural material in a bin. In FIG. 2C the inside of one wall of bin similar to bin 215 is shown. Dotted line 245 represents the shape of the surface of material in the bin in analogy to line 220. Lights 250, 252, 254, 256 and 258 are fixed on the inside wall of the bin and form a measuring stick for estimating the quantity of material in the bin. Optional lights 251, 253, 255, 257 and 259 form a similar measuring stick. The lights are preferably light emitting diodes (LEDs) although other light sources may be used.

Photo-detector 270 detects light emitted by any of LEDs 250-259 when they are not obscured by material in the bin. Determination of which LEDs are obscured and which are visible may be made in a variety of ways. The LEDs may be modulated at different frequencies, for example. Suppose one LED is modulated at 10 kHz and another at 15 kHz. If the photo-detector detects light modulated at 10 kHz but not 15 kHz, then one may infer that the LED modulated at 15 kHz is obscured by material in the bin.

FIG. 2D illustrates another example modulation scheme. In FIG. 2D, traces 260, 262, 264, 266 and 268 represent light output by LEDs 250, 252, 254, 256 and 258 respectively. The traces do not share a common absolute vertical scale. Most of the time, the lights are turned off; from time to time they emit pulses of light of duration t as marked in the figure. The pulses are emitted at regular intervals and delayed with respect to the pulses emitted by LED 250. Pulses from LED 252 are delayed by t; those from LED 254 are delayed by 2t; those from LED 256 are delayed by 3t; etc. Trace 280 shows the time dependence of light detected by photo-detector 270 when LEDs 250 and 252 are visible, but LEDs 254, 256 and 258 are obscured by material in the bin. The result is a pulse of duration 2t. If LED 254 had been visible, then the pulse width recorded by photo-detector 270 would have been 3t. Thus pulse width corresponds to the level of material in the bin. The pulses may represent the envelope of a waveform containing a carrier frequency since detecting a modulated carrier, rather than a direct-current level, often offers improved sensitivity in practice.

The video systems of FIG. 2 may be combined with image analysis software running on a processor to provide accurate estimates of material volume in a bin. The time derivative of the estimated volume of material in a bin gives an estimate for the rate of material flow into the bin. Video images may also be displayed directly to a human operator (e.g. the driver of a spreader truck) for rough estimates. Finally, video images and/or volume estimates derived from them may be transmitted wirelessly from a truck to a central station. That way volume in several trucks may be monitored in one place.

2. Spectral Measurements to Determine Weight and/or Center of Gravity

Volume measurement techniques are presented above as an alternative to weight measurements. However, direct weight measurements are sometimes necessary and/or desirable. If a material in a bin is compressible, for example, weight may be a more useful measurement as the density of material at the bottom of the bin may be greater than that at the top of the bin. Conventional load cell weight measurement techniques suffer from noise when a truck rolls over uneven ground. Low pass filtering of load cell output with a sufficiently long time constant to smooth out the noise may obscure the real rate of accumulation or dispersal of material. These problems may be solved by using spectral techniques to analyze vibrational modes in the suspension of a truck carrying a load of agricultural material. Two classes of techniques are described below.

In the first, the spectrum of load cell measurements is monitored; the second relies on the spectrum of angle sensor measurements.

Figure 3:
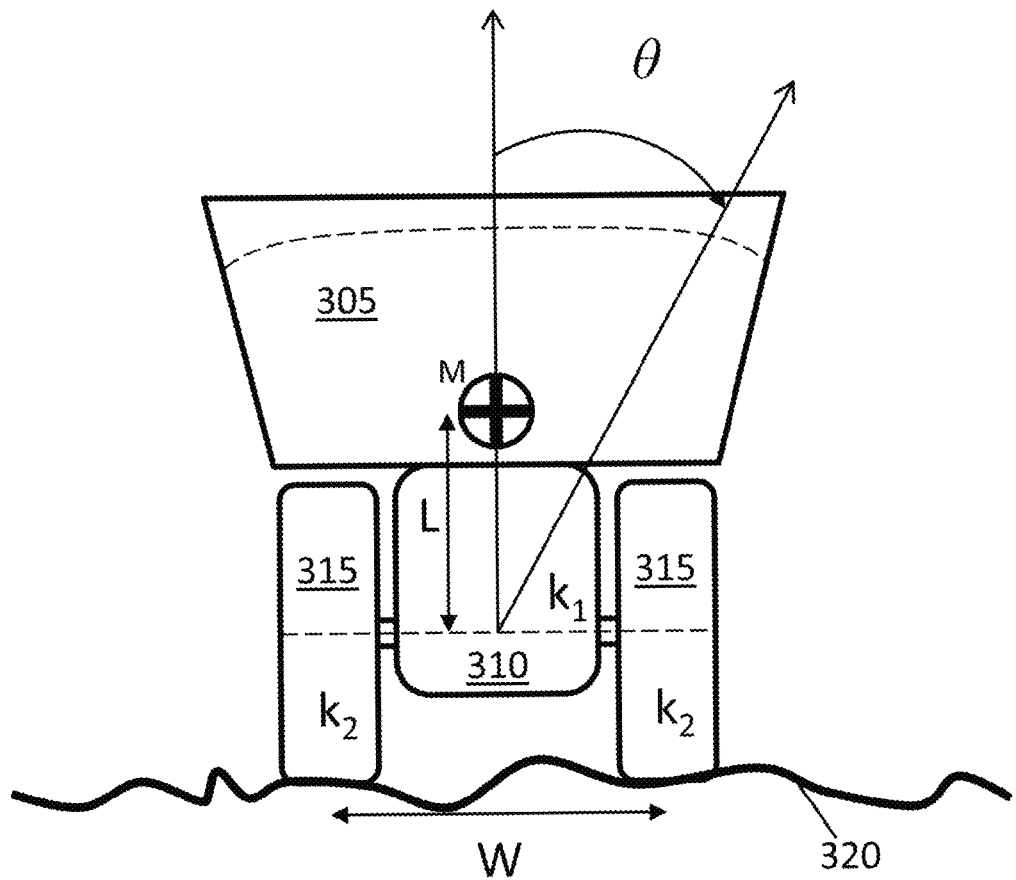
FIG. 3 illustrates parameters used in estimating the weight of dry agricultural material in a bin using spectral methods.

FIG. 3 illustrates parameters used in estimating the weight of dry agricultural material in a bin using spectral methods. In FIG. 3, bin 305 is part of a truck that also includes suspension 310 and wheels 315. The truck rolls over bumpy ground 320. As the truck moves along, its load is jostled about by the suspension. The frequency of this motion is either a driving frequency determined by the topography of the ground or a resonant frequency of the suspension. A few examples illustrate this behavior. First, if the truck drives over a perfectly sinusoidally corrugated surface, then the load vibrates at a frequency determined by the spatial frequency of the corrugations and the speed of the truck passing over them. Next, if the truck drives over a single impulse bump on an otherwise flat surface, the load vibrates at a resonant frequency of the suspension. Finally, and more generally, when the truck drives over a typical bumpy road or field surface, the spectrum of vibrations of the load has features that depend on properties of the suspension and the weight of the load.

It is common for truck suspensions to include load cells for measuring the weight of material being carried by the truck. The suspension of the truck may be modeled as a spring with spring constant $k_1$. If the output of the load cells is sampled at a frequency greater than the typical vibration frequency of the suspension, a Fourier transform of load cell temporal data reveals the suspension's resonant frequencies. A load cell may be sampled at 50 Hz for example and the resulting data analyzed with a fast Fourier transform (FFT). The vertical motion, z, of the truck bin has the form $z \propto \sin(\omega t)$ where $$\omega = \sqrt{\frac{k_1}{m}}$$

and m is the mass of the load carried by the suspension. As the truck gets heavier it bounces at lower frequency; the frequency varies inversely as the square root of the weight of the load. $k_1$ may be determined by measuring resonant frequencies of a truck's suspension for a few known loads; once $k_1$ is known, frequency measurements may be used to estimate the weight of any load. This method of estimating weight is complementary to the conventional method: spectral methods work with data obtained in motion, while load cells work best when a vehicle is stopped.

An alternative to a load cell is an angle sensor such as a micro-electromechanical systems (MEMS) gyro. Referring again to FIG. 3, an angle sensor measures rotation in the direction indicated by θ. The mass, M, of the load has its center of gravity located a distance L above the truck's axle. The effective spring constant of the tires is $k_2$ and the track width is W. As the truck rumbles over rough ground, its side-to-side rocking motion, θ, has the form $\theta \propto \sin(\omega t)$ where $$\omega = \sqrt{\frac{k_2 W}{ML}}$$

and M is the mass of the load carried by the suspension. As the truck gets heavier it rocks with lower frequency; the frequency varies inversely as the square root of the weight of the load. The frequency is also affected by the height of the center of gravity. If the weight of agricultural material in the bin significantly affects the height of the center of gravity, then the accuracy of weight measurements may affected. On the other hand, if this is the case, then spectral measurements may be used to determine center of gravity height when mass is known. Center of gravity height can in turn be used to predict and prevent truck rollover. If the density of material to be carried in the truck is constant (e.g. truck always used to carry grain), then calibration experiments with a few known loads yield data that enables estimation of $k_2$ and therefore the weight of future loads.

Figure 4:
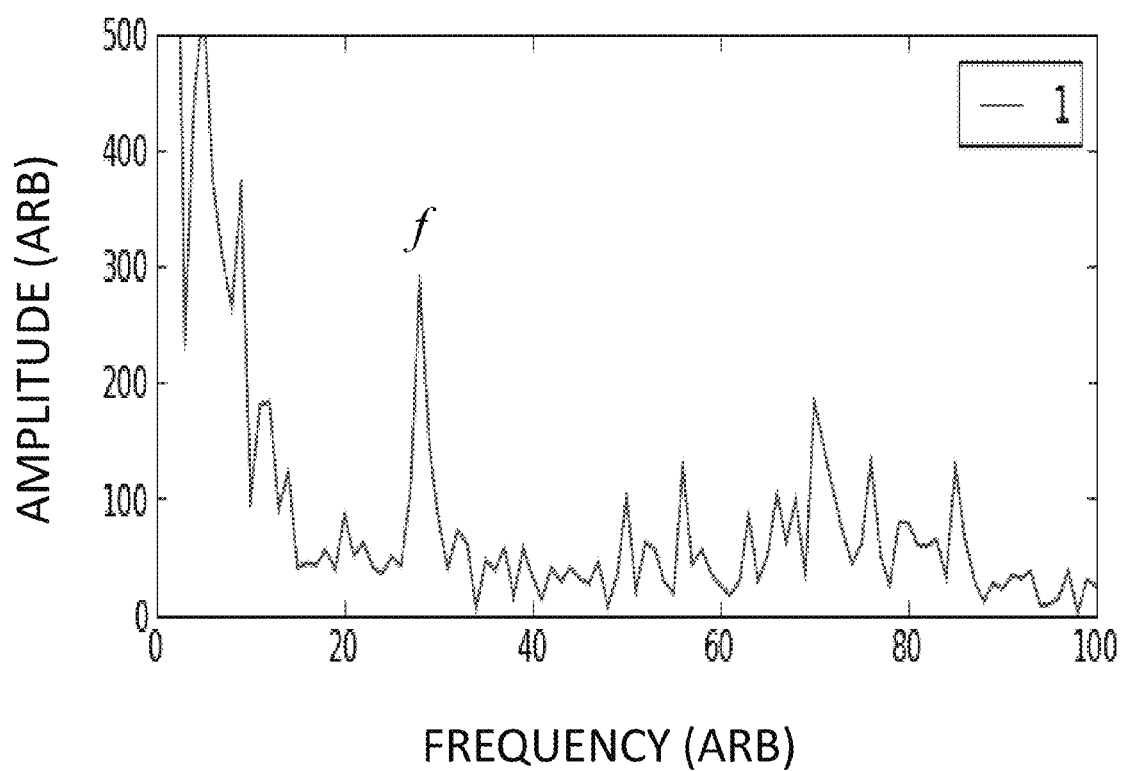
FIG. 4 shows an example of spectral data used in estimating the weight of dry agricultural material in a bin.

FIG. 4 shows an example of spectral data used in estimating the weight of dry agricultural material in a bin. FIG. 4 shows the spectrum of vehicle roll frequency. In this case the vehicle was a New Holland TG245 tractor moving at about 3.5 mph along a gravel road. Roll angle data were collected at 50 Hz and then analyzed using an FFT. Both the vertical (intensity) and horizontal (frequency) scales are arbitrary. The letter "f" marks a typical spectral peak, in this case at roughly 0.6 Hz. The frequency of spectral peaks changes as vehicle weight changes. FFT data may be analyzed by software running on a processor in the truck or at a remote location when the data is transmitted wirelessly.

3. Material Flow Rate Measuring System

The devices and techniques described above provide measurements of volume and weight of material in a bin. It is also useful and necessary to measure the flow rate of material into or out of a bin. Of course, flow rate can be deduced from a series of volume or weight measurements: the volume or weight flow rate is the time derivative of the volume or weight of the material in the bin. In some situations, however, flow rate is the primary measured quantity and volume or weight may be determined by integration. An example is grain collection in a combine harvester. A grain elevator carries grain from threshing and winnowing apparatus up to a clean grain tank. Conventional systems use impact sensor plates at the top of the clean grain elevator to estimate mass flow. Integrated flow sensor data is used to estimate the amount of grain in the clean grain tank and therefore when the tank needs to be emptied to a grain cart.

Figure 5:
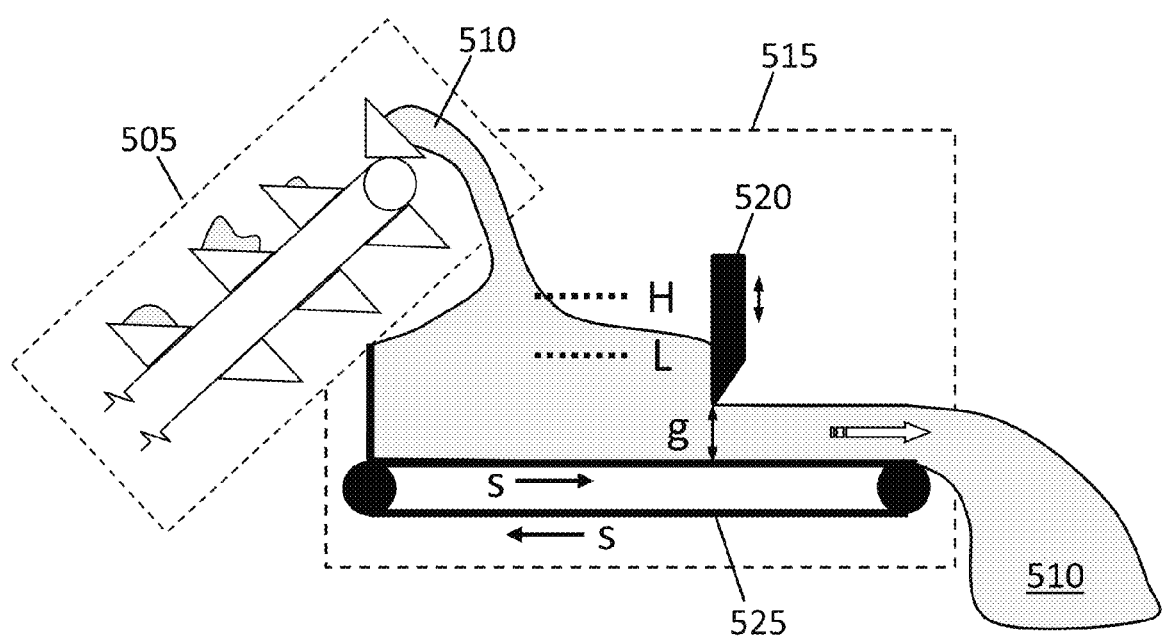
FIG. 5 shows an apparatus for measuring the flow rate of a dry agricultural material such as grain.

FIG. 5 shows a new apparatus for measuring the flow rate of a dry agricultural material such as grain. In FIG. 5, bucket elevator 505 delivers grain 510 to a specially designed flow rate measuring bin 515. The bin is equipped with an adjustable outflow gate 520 and a flat belt conveyor 525. Of course, other ways may be used to dump grain into the flow measuring bin and other materials besides grain may be measured.

Flow rate measuring bin 515 has grain flowing into it at an unknown (i.e. to be measured) rate. Grain flows out of the bin at a known rate that is determined by the speed, s, of conveyor belt 525 and the size, g, of the opening set by outflow gate 520. When the inflow and outflow rates are the same, the level of grain in the bin remains unchanged. Put another way, finding the outflow rate that keeps the grain level constant represents a measurement of the unknown inflow rate.

The grain level in the bin may be monitored by optical or mechanical sensors. Suitable example systems for measuring the grain level include the video and optical measurements of volume of material in a truck or bin as described above. The flow rate measuring bin keeps the level of grain in the bin between high, H, and low, L, reference marks by varying the speed, s, of conveyor belt 525. If the level gets too high (e.g. at or above the H mark), the speed of the belt is increased. If the level gets too low (e.g. at or below the L mark), the speed of the belt is decreased.

Normally, belt speed and gate height are maintained within optimal ranges. If the belt reaches either its fastest or slowest speed, it can no longer regulate the outflow of grain as needed.

When this happens, the regulation range is extended by varying the size, g, of the opening of outflow gate 520. As the belt approaches its fastest speed, gate 520 is raised to increase the flow rate of grain leaving the bin. As the belt approaches its slowest speed, the gate is lowered to restrict the flow of grain leaving the bin. This way a large, accurately measurable range of grain flow rates is achieved. Depending on the mechanical details of the gate and belt actuators, the roles of the gate and belt in adjusting the flow measuring range may be reversed. The longer the gate opening and belt speed remain constant or nearly so, the more accurate flow rate measurements are possible.

The volume rate of grain measured by the system is equal to the belt speed multiplied by the effective area of the outflow gate opening. A calibration may be necessary to determine the relationship between the actual and effective areas of the outflow gate opening; normally the effective area is less than the actual area. Thus the flow rate is a function of belt speed and gate area. The total volume of grain that passes through the flow rate measuring bin in a certain time interval is the integrated rate over that time interval.

4. Wireless Communication of Measurements Among Farm Equipment

Combine harvesters store grain temporarily in clean grain tanks before offloading to grain carts. Transfer from combine to cart can happen while both vehicles are in motion. The cart moves grain to the edge of a field where trucks wait on roads to take the grain to mills. As discussed above, a combine harvester typically keeps track of the weight of the grain in its clean grain tank by integrating the flow rate of grain into the tank. Harvest conditions, yield variations and other factors may all affect the calibration of the flow rate measuring system. Therefore, the more accurately and often the system can be calibrated by weighing harvested grain, the better.

Figure 6:
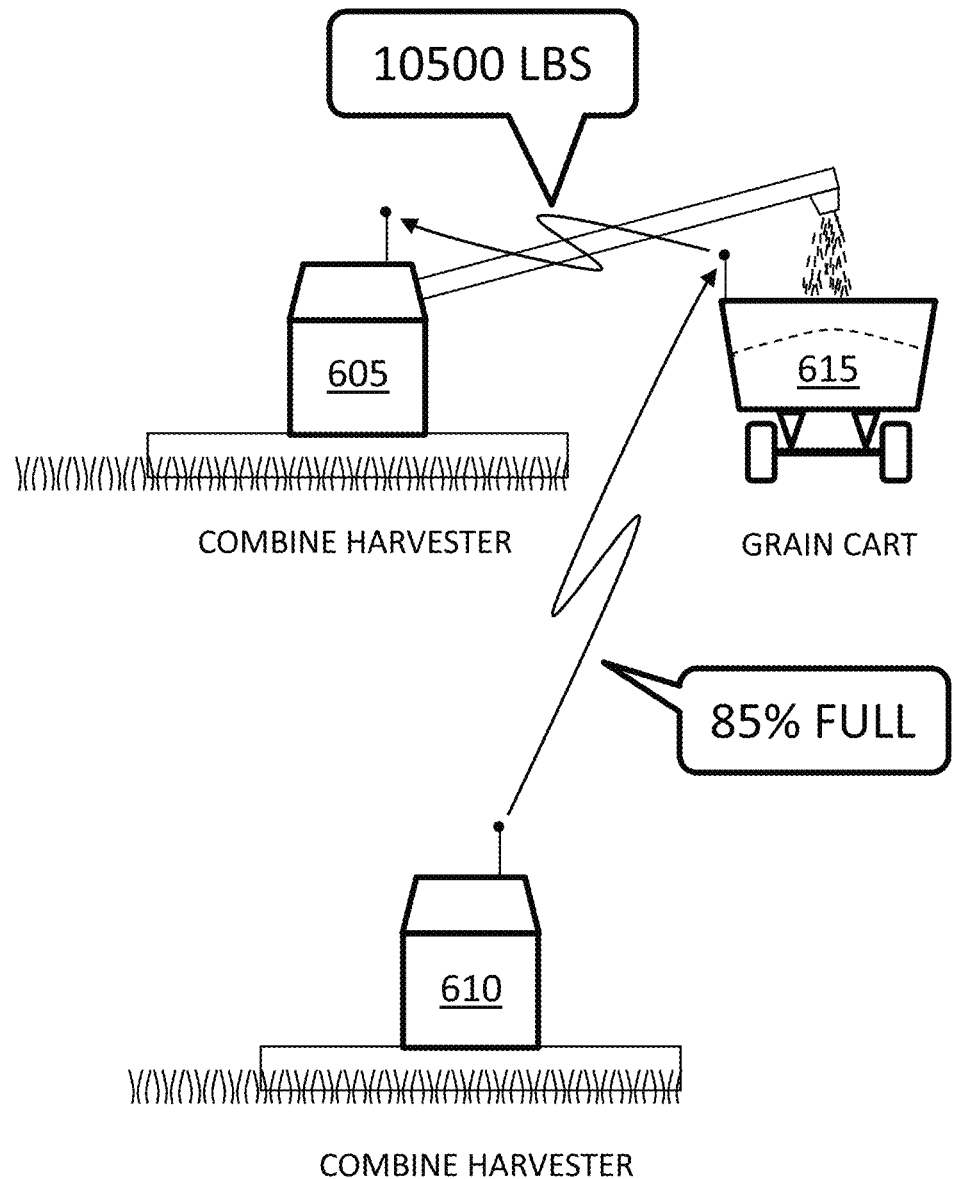
FIG. 6 illustrates wireless communication of weight information from a grain truck to a combine harvester.

FIG. 6 illustrates wireless communication of weight information from a grain truck to a combine harvester. In FIG. 6, combine harvester 605 is equipped with a wireless data link that connects it to grain cart 615. Combine 610 is equipped with a similar link. The wireless system allows the combines and cart to communicate data concerning the amount of grain in the combines' clean grain tanks and the weight of offloaded grain.

As an example, grain cart 615 may join formation with combine 605 for in-motion offloading of grain. Once the transfer is complete, the cart stops briefly to record its own weight as reported by load cells in its axles and tow hitch. (Stopping the cart improves the accuracy of weight measurements obtained via load cell; the combine is free to continue harvesting without stopping.) Alternatively, to determine weight while in motion, the cart may use one of the spectral methods described above. Once the cart has determined the weight of the offloaded grain it reports the results to the combine via wireless link; in the figure the reported weight is 10,500 lbs. The combine then compares the weight reported by the cart to its own estimate of the weight obtained by integrating the fill rate of the clean grain tank. Differences are then used to update the calibration of the grain flow sensor and to adjust yield data already obtained.

Wireless communication of measurements among farm equipment is also useful for allocating and scheduling resources. As an example, consider a situation in which several combine harvesters are working in a large field. If the harvesters are able to communicate the amount of grain in their clean grain tanks to a grain cart wirelessly, the cart can make optimized decisions about the order in which to unload the combines. In the figure, combine 610 reports that it is 85% full to the cart. The combine may also report its current fill rate (e.g. 200 pounds per minute) and/or the time remaining until the combine will be full at the current fill rate. A processor onboard the cart may then use quantity and rate information from the combines to build a schedule for optimally unloading them. Linear and/or integer programming are examples of techniques that may be used to determine an unloading schedule.

5. Communicating Grain Levels by TDMA Video Network

A variation of wireless communication of measurements among farm equipment involves sending video images. Video images are easy for humans to interpret, but they consume communications bandwidth. A time-division-multiplexed video communications system allows video images from several pieces of equipment to be received at a common station excessive use of radio spectrum.

An example illustrating the utility of video communication in farming is the problem of unloading multiple combine harvesters with a single grain cart. The driver of the grain cart must keep track of the grain level in each of the combines working the field and empty them on a timely basis. If the cart operator does not keep track of how full the combines are, one of them may fill up, have to stop, and thus slow down the entire harvesting operation. Currently there is no adequate way for the cart operator to know how much grain is in each combine. The combine drivers themselves often do not know how much grain is in their machines and few combines have grain level sensors. It takes a cart operator of unusual skill to keep all the combines adequately empty to allow them to operate continuously and efficiently. To prevent having to stop any of the combines, often two or more less-capable cart operators are employed. More efficient operation can be achieved with video monitoring and communication.

Figure 7:
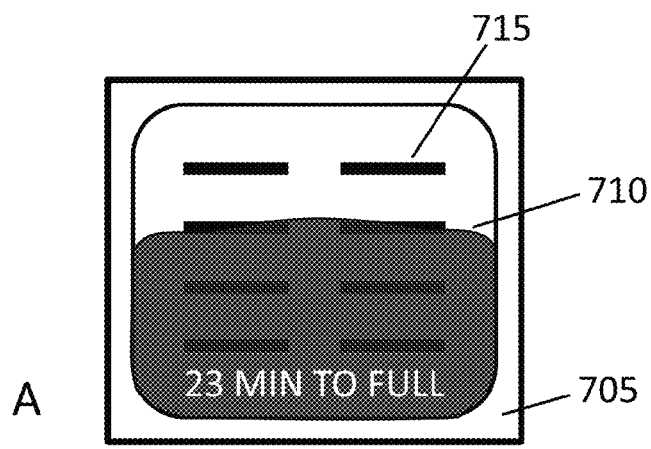
FIG. 7 shows examples of video displays in a time-division-multiplexed video communications system.
Figure 7:
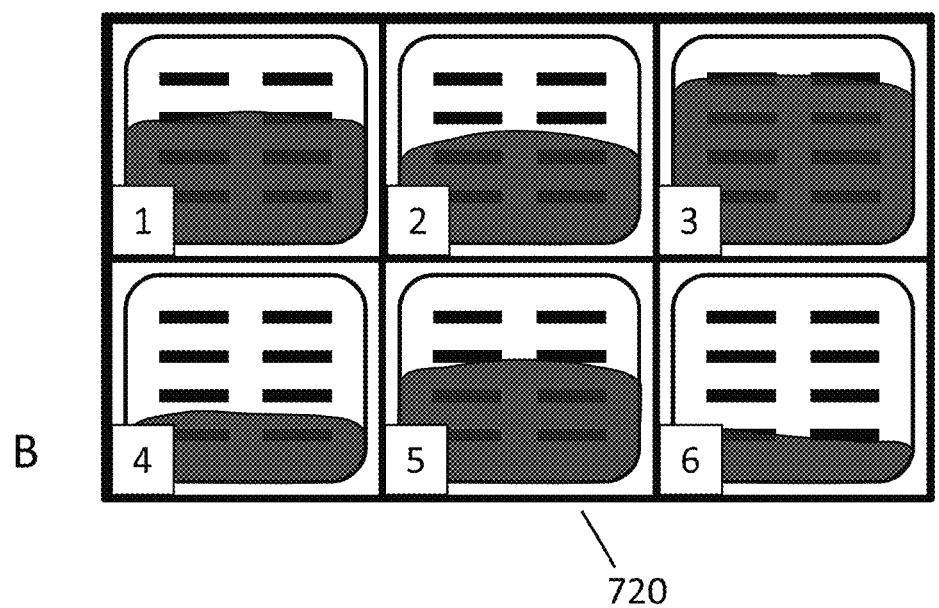

FIG. 7 shows examples of video displays in a time-division-multiplexed video communications system. In FIG. 7, "A" shows a video display for use in a combine harvester or other equipment having a bin in which the level cola dry agricultural material is to be monitored. Display 705 provides a view of the inside of a bin, e.g. a clean grain tank. The view shown by display 705 is provided by a video camera mounted to aim at the inside of the grain tank. The level 710 of grain in the tank is immediately apparent to an operator looking at the display. Optional reference marks (e.g. 715) on the inside of the tank help the viewer quantify their impressions of how much grain is in the tank or bin. (These marks are analogous, or even identical, to reference lines 230, 231, 232 shown in, and discussed above in connection with, FIG. 2.) In addition, messages may be displayed. In FIG. 7 at "A" a message ("23 MIN TO FULL") indicating that the bin shown will be full in 23 minutes at the current fill rate is shown. Estimates of time to full may be supplied by wireless link from the equipment having the bin or may be generated by video analysis software included in a video system.

The video camera that is connected to display 705, and provides the view of the inside of the tank, is also connected to a radio transmitter that is set to transmit on the same frequency as other similar transmitters in other combines. Interference between radio signals transmitted by different combines is avoided by having each combine transmit in its own time slot. As an example, if there are six combines, each one may transmit during one of six consecutive time slots lasting for one second each. The timing of the video transmissions is scheduled using timing signals obtained, for example, from a global navigational satellite system receiver. This simple, time division multiplexing scheme allows the system as a whole to operate within the bandwidth normally required for one radio signal. Of course, other multiplexing schemes, such as code division multiplexing, will also work.

In FIG. 7, "B" illustrates a display 720 that shows video images from six combine harvesters on one screen. The operator of a grain cart equipped with such a display can quickly see (following the example in FIG. 7 "B") that he must first unload combine harvester #3, followed by #1. Harvesters #2 and #5 will likely be next. Combines #4 and #6 are nearly empty and thus do not require attention until later. Presenting a human operator with visual information such as that shown by display 720, and allowing the operator to make decisions based on that information, is an alternative to having a processor run an optimization routine on numerical data as mentioned above.

CONCLUSION

Dry agricultural materials management encompasses measuring the volume and/or weight of materials in a bin, measuring the rate of change of the volume and/or weight, and communicating quantity and rate information among operators of farm equipment so they can do their jobs more efficiently.

Some of the systems and methods described above, such as spectral measurements and the flow rate measuring bin, are carried out by machines and electronic processors. Others, such as time division multiplexed video for inspecting the contents of a bin, rely on human interpretation of images. A third group, including video measurements and wireless data communication, may be either automatic or human-in-the-loop. Thus, video can be shown to a person or fed to image analysis software. Raw data can be displayed for human interpretation or fed to number crunching software for more sophisticated analysis. The applications and needs of users separate these possibilities.

The above description of the disclosed embodiments is provided to enable any person skilled in the art to make or use the disclosure. Various modifications to these embodiments will be readily apparent to those skilled in the art, and the principles defined herein may be applied to other embodiments without departing from the scope of the disclosure. Thus, the disclosure is not intended to be limited to the embodiments shown herein but is to be accorded the widest scope consistent with the principles and novel features disclosed herein.

What is claimed is:

1. A method for measuring volume flow rate of dry, agricultural material comprising:
   continuously adding dry, agricultural material to a bin, the material filling the bin up to a certain level, and the bin having:
      an outflow gate permitting flow through a cross-sectional area G,
      and a flat belt conveyor for moving the material toward the outflow gate with speed S;
   providing reference marks on the inside of the bin;
   providing a video camera positioned to view the inside of the bin;
   analyzing video images of the inside of the bin to monitor the level of the material in the bin in relation to the reference marks;
   adjusting the speed S of the conveyor to regulate outflow of the material from the outflow gate and thereby maintain the level between high and low reference marks; and,
   estimating the volume flow rate of the material into the bin as a function of the product of G and S.

2. The method of claim 1, the reference marks being distinguishable from one another by color.

3. The method of claim 1, the reference marks being lines having patterns of dashes that distinguish one line from another.

4. The method of claim 1, the area of the gate being adjustable.

5. The method of claim 4 further comprising:
   adjusting the outflow gate to permit flow through a smaller cross-sectional area when the conveyor reaches a slow speed limit.

6. The method of claim 4 further comprising:
   adjusting the outflow gate to permit flow through a larger cross-sectional area when the conveyor reaches a high speed limit.

7. A method for measuring volume flow rate of dry, agricultural material comprising:
   continuously adding dry, agricultural material to a bin, the material filling the bin up to a certain level, and the bin having:
      an adjustable outflow gate permitting flow through a cross-sectional area G,
      and a flat belt conveyor for moving the material toward the outflow gate with speed S;
   providing reference marks on the inside of the bin;
   providing a video camera positioned to view the inside of the bin;
   analyzing video images of the inside of the bin to monitor the level of the material in the bin in relation to the reference marks;
   adjusting the speed S of the conveyor and the area G of the gate to regulate outflow of the material from the outflow gate and thereby maintain the level between high and low reference marks; and,
   estimating the volume flow rate of the material into the bin as a function of the product of G and S.

8. The method of claim 7, the reference marks being distinguishable from one another by color.

9. The method of claim 7, the reference marks being lines having patterns of dashes that distinguish one line from another.

10. A method for measuring volume flow rate of dry, agricultural material comprising:
    continuously adding dry, agricultural material to a bin, the material filling the bin up to a certain level, and the bin having:
       an adjustable outflow gate permitting flow through a cross-sectional area G,
       and a flat belt conveyor for moving the material toward the gate with speed S;
    providing reference marks on the inside of the bin;
    providing a video camera positioned to view the inside of the bin;
    analyzing video images of the inside of the bin to monitor the level of the material in the bin in relation to the reference marks;
    adjusting the area G of the gate to regulate outflow of the material from the outflow gate and thereby maintain the level between high and low reference marks; and,
    estimating the volume flow rate of the material into the bin as a function of the product of G and S.

11. The method of claim 10 further comprising:
    adjusting the conveyor to increase the speed of material moving toward the gate when the gate reaches a maximum area limit.

12. The method of claim 10 further comprising:
    adjusting the conveyor to decrease the speed of material moving toward the gate when the gate reaches a minimum area limit.

13. The method of claim 10, the reference marks being distinguishable from one another by color.

14. The method of claim 10, the reference marks being lines having patterns of dashes that distinguish one line from another.

* * * * *